(12) United States Patent
Goto

(10) Patent No.: US 7,730,502 B2
(45) Date of Patent: Jun. 1, 2010

(54) DISC CHANGER HAVING DISC DISCHARGE MECHANISM

(75) Inventor: Tsutomu Goto, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 385 days.

(21) Appl. No.: 11/338,105

(22) Filed: Jan. 23, 2006

(65) Prior Publication Data
US 2006/0168603 A1 Jul. 27, 2006

(30) Foreign Application Priority Data
Jan. 24, 2005 (JP) ............................. 2005-015158
Dec. 28, 2005 (JP) ............................. 2005-379233

(51) Int. Cl.
G11B 17/03 (2006.01)
G11B 17/04 (2006.01)
G11B 33/02 (2006.01)
(52) U.S. Cl. ...................... 720/615; 720/623; 720/633; 720/647
(58) Field of Classification Search ................. 720/615, 720/645, 623, 633, 647; 360/132
See application file for complete search history.

(56) References Cited

U.S. PATENT DOCUMENTS

| | | | | |
|---|---|---|---|---|
| 4,839,880 A | * | 6/1989 | d'Alayer de Costenore d'Arc et al. ........ | 720/615 |
| 4,845,700 A | * | 7/1989 | Koizumi et al. | 720/615 |
| 5,528,567 A | * | 6/1996 | Kim | 369/30.94 |
| 5,640,288 A | * | 6/1997 | Horie | 360/98.04 |
| 5,737,285 A | * | 4/1998 | Uchiyama | 369/30.32 |
| 5,828,647 A | * | 10/1998 | Lee et al. | 720/615 |
| 5,936,930 A | * | 8/1999 | Bando | 369/30.9 |
| 6,097,693 A | * | 8/2000 | Nakamichi | 720/713 |
| 6,157,607 A | * | 12/2000 | Nakamichi | 720/623 |

(Continued)

FOREIGN PATENT DOCUMENTS

CN 1142668 A 2/1997

(Continued)

OTHER PUBLICATIONS

Patent Abstract of Japan, Publication No. 07-320359, Published Dec. 8, 1995, in the name of Okamoto Akihiko.

(Continued)

Primary Examiner—Andrea L Wellington
Assistant Examiner—Adam B Dravininkas
(74) Attorney, Agent, or Firm—Christie, Parker & Hale, LLP.

(57) ABSTRACT

There is provided a disc changer for a disc drive unit, including: a disc accommodation section capable of accommodating plural discs: a disc pushing mechanism that pushes a disc from a specific rack of the disc accommodation section to a disc discharge position within the disc drive unit; and a disc discharge mechanism that securely sends the disc at the disc discharge position, to a disc insertion/discharge opening of the disc drive unit. The disc exchanger further includes a disc guiding device that has: an upper and a lower guiding members, which are provided in an area within the disc drive unit adjacent to the disc insertion/discharge opening, and guide the disc pushed by the pushing mechanism, to the disc insertion/discharge opening; and a drive mechanism of the guiding members, that opens the lower guiding member from the upper guiding member, when the pushing mechanism pushes the disc.

12 Claims, 7 Drawing Sheets

U.S. PATENT DOCUMENTS

| | | | |
|---|---|---|---|
| 6,466,524 B1 * | 10/2002 | Fujimoto | 369/30.85 |
| 6,496,471 B1 * | 12/2002 | Sato et al. | 720/615 |
| 6,817,022 B1 * | 11/2004 | Taniguchi et al. | 720/623 |
| 7,073,184 B2 * | 7/2006 | Otsuki | 720/615 |
| 2001/0022766 A1 * | 9/2001 | Nakanishi et al. | 369/77.1 |
| 2002/0024895 A1 * | 2/2002 | Takizawa et al. | 369/30.77 |
| 2003/0095491 A1 * | 5/2003 | Adachi et al. | 369/77.1 |

FOREIGN PATENT DOCUMENTS

| | | |
|---|---|---|
| JP | 7-320359 | 12/1995 |
| JP | 2000-40290 | 2/2000 |
| JP | 2001-351302 | 12/2001 |
| JP | 2003-036586 | 2/2003 |
| JP | 2003-141809 | 5/2003 |

OTHER PUBLICATIONS

Patent Abstract of Japan, Publication No. 2000-040290, Published Feb. 8, 2000, in the name of Matsumoto Akira, et al.

Patent Abstract of Japan, Publication No. 2003-141809, Published May 16, 2003, in the name of Otsuki Akira.

Patent Abstracts of Japan and English machine translation of JP 2001-351302 listed above.

Patent Abstracts of Japan and English machine translation of JP 2003-036586 listed above.

* cited by examiner

DISC CHANGER HAVING DISC DISCHARGE MECHANISM

CROSS-REFERENCE TO RELATED APPLICATION

This application claims priority from, and incorporates by reference the entire disclosure of, Japanese Patent Application No. 2005-015158, filed on Jan. 24, 2005, and Japanese Patent Application No. 2005-379233, filed on Dec. 28, 2005.

BACKGROUND OF THE INVENTION

1. Field of the Invention

The present invention relates to a disc changer. Particularly, the invention relates to a disc changer incorporated in a disc drive unit, the disc changer having a disc guiding device structured to expand an opening of a disc discharging guide, provided inside the disc drive unit near a disc insertion/discharge opening, at the time of discharging a disc to the outside of the disc drive unit.

2. Description of the Related Art

Conventionally, a cassette tape has been the mainstream medium recorded with music to provide music in a motor vehicle, However, a disc medium such as a compact disc (CD) and a mini disc (MD) is now mainly used in place of the cassette tape. Because the disc medium is thinner than the cassette tape, and particularly because an optical disc like the CD is not in a case, a disc changer that accommodates plural discs in a reproducing unit and reproduces the recorded content by changing the discs is popular. A disc changer is also being developed for a digital versatile disc (DVD) type of optical disc.

This disc changer of optical discs has a disc accommodation section capable of separately accommodating plural discs, one by one, inside a casing. A swing arm takes out a desired one of the discs from this disc accommodation section, and reproduces the content of the disc using an optical head. When the reproduction ends, the swing arm returns the disc to the disc accommodation section. In general, a turntable on which a disc is rotated and a clamper that fixes the disc onto the turntable are provided at the front end of the swing arm. An optical head moves in a radial direction of the optical disk, on a moving path formed on the swing arm, on the disc that rotates on the turntable, thereby reproducing the information recorded on the disc. Generally, the disc changer has the disc accommodation section movably arranged, in the up and down directions, to facilitate the taking out of a desired one disc from the disc accommodation section.

The disc drive unit that incorporates the CD disc changer can accommodate plural discs within the disc changer, and can alternately reproduce the content recorded on each CD. However, in some cases, a disc accommodated in the disc changer needs to be exchanged with a disc provided at the outside of the disc drive unit. To meet this requirement, the disc changer has a function of exchanging a disc accommodated within the disc accommodation section, that is, a disc insertion/discharge mechanism for inserting a disc into and discharging a disc from the disc drive unit respectively.

When a disc is inserted into the disc drive unit from a disc insertion/discharge opening of the disc drive unit by being guided by a roller, the disc insertion/discharge mechanism sends the disc to the disc accommodation section, using a separate insertion mechanism, when the disc reaches a predetermined detection position. On the other hand, in discharging a disc from the disc accommodation section to the outside of the disc drive unit, a pushing mechanism pushes the disc to a discharge position where the disc is to be discharged by a roller. Then, the roller discharges the disc from the disc insertion/discharge opening of the disc drive unit.

An early CD disc changer was large in size, and was accommodated in a trunk of a motor vehicle. However, due to an increasingly compact size of the disc changer in recent years, the disc drive unit that incorporates the disc changer can be accommodated in a center console of an instrument panel of the motor vehicle.

However, as a result of the small disc changer in the disc drive unit, parts within the disc changer have little margin in size. Therefore, at the time of discharging a disc from the disc drive unit, the front end of the disc is fluctuated. This has a risk that the disc is collided against the disc insertion/discharge opening of the disc drive unit, when the pushing mechanism pushes the disc to the position where the disc is to be discharged by a roller and when the roller discharges the disc from the disc insertion/discharge opening.

SUMMARY OF THE INVENTION

It is an object of the present invention to provide a disc changer having a disc guiding device that solves the conventional problems of the disc changer at the disc discharging time, and that can smoothly discharge a disc from a disc drive unit, without a risk of a collision of the disc against a disc insertion/discharge opening, in the disc changer having a compact size with little margin in the internal size.

In order to achieve the above object, according to a first aspect of the present invention, there is provided a disc changer for a disc drive unit, including: a disc accommodation section capable of accommodating a plurality of discs; a disc reproducing section that reproduces content of a disc; a disc discharge mechanism that discharges a disc carried by a carrying mechanism to a discharge direction, from a discharge opening of the disc drive unit: a guiding member that is provided near the disc discharge opening, and that guides the disc carried by the carrying mechanism, to the disc discharge mechanism; and a guiding member drive mechanism that evacuates the guiding member to a position where the guiding member is not brought into contact with the disc, at the time of reproducing the content of the disc, and that moves the disc carried by the carrying mechanism, to a guided position, at the time of discharging the disc.

According to a second aspect of the invention, there is provided the disc changer for a disc drive unit according to the first aspect, wherein the drive mechanism drives the guiding member at the disc discharge time so as to form a tapered surface from the carrying mechanism side toward the disc discharge opening. According to a third aspect of the invention, there is provided the disc changer for a disc drive unit according to the first aspect, wherein the guiding member includes an upper guiding member and a lower guiding member, the upper guiding member is fixed to the disc drive unit, and only the lower guiding member is moved.

According to a fourth aspect of the invention, there is provided the disc changer for a disc drive unit according to the first aspect, wherein a drive source of the carrying mechanism and a drive source of the drive mechanism of the guiding member are the same. According to a fifth aspect of the invention, there is provided the disc changer for a disc drive unit according to the first aspect, wherein the drive mechanism of the guiding member drives the guiding member linked to the move of a disc pushing lever of the carrying mechanism.

According to a sixth aspect of the invention, there is provided the disc changer for a disc drive unit according to the fifth aspect, wherein the drive mechanism of the guiding member increases a slope angle of the tapered surface of the guiding member when a rotation angle of the pushing lever becomes larger, linked to the move of the disc pushing lever of the carrying mechanism. According to a seventh aspect of the invention, there is provided the disc changer for a disc drive unit according to the first aspect, wherein the height of an opening of the guiding member is usually the height of one disc.

According to the disc exchanger of the present invention, even when the disc exchanger is made compact and has little margin in its internal size, a disc can be smoothly discharged from a disc drive unit, without a collision of the disc against a disc insertion/discharge opening.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Disc changers according to embodiments of the present invention are explained in detail below with reference to the accompanying drawings.

Figure 1:
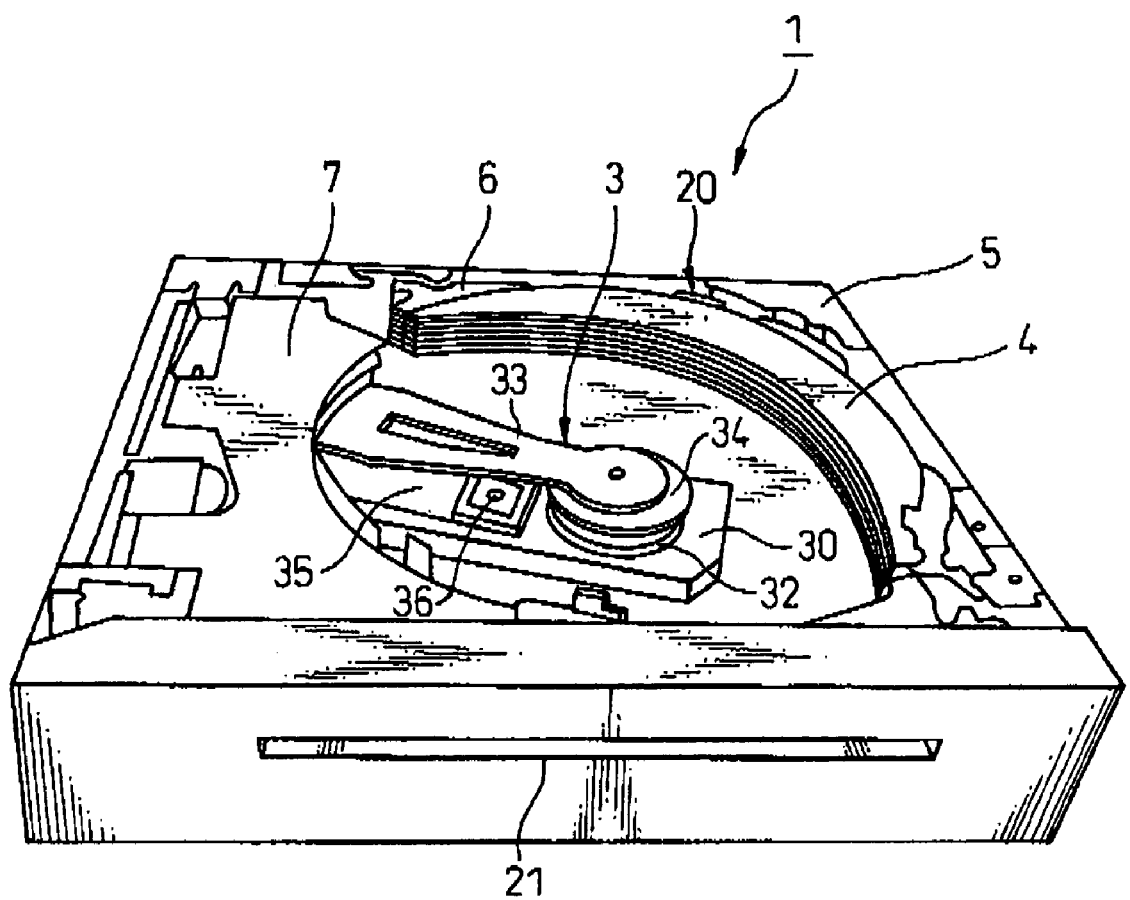
FIG. 1 is a perspective view of a configuration of a disc changer to which the present invention is applied.

FIG. 1 is a perspective view of a configuration of a disc changer 1 to which the present invention is applied, where a disc is not accommodated. The disc changer 1 to which the present invention is applied includes a stocker 4 as a disc accommodation section capable of accommodating plural discs and capable of being lifted up and moved down within the disc changer, a swing arm 3 that takes out a disc from the stocker 4, reproduces content of the disc, and returns the disc to the stocker 4 after the reproduction, a drive unit 7 of the swing arm 3, a linear position sensor (not shown) that detects a position of the stocker 4, and a lifting mechanism 5 that lifts up and moves down the stocker 4 based on an output of the linear position sensor.

The swing arm 3 is rotated by the drive unit 7, and broadly includes a frame 30 and a clamp arm 33. A turntable 32 on which a disc is rotated is provided at the front end of the frame 30. An optical head 36 and a moving path 35 on which the optical head 36 moves are provided at the center of the frame 30. A base of the clamp arm 33 is fitted to the upper part of the frame 30 with a rotating axis. A damper 34 that clamps a disc is rotatably provided at the front end of the clamp arm 33. The front end of the clamp arm 33 rotates to the frame 30 side, and sandwiches and fixes a disc mounted onto the turntable 32 with the damper 34.

A position of the swing arm 3 in a vertical direction within the disc changer 1 is unchanged, and is constant. Therefore, in order to enable the swing arm 3 to clamp a desired one of the discs accommodated in the stocker 4, the stocker 4 is divided in a vertical direction and moves within the disc changer 1. The stocker 4 has one stocker base, and plural movable stockers as movable racks mounted on the stocker base. Each movable stocker can accommodate one disc. The stocker 4 moves up and down within the disc changer 1 based on the operation of the stocker lifting mechanism 5. In order to enable the swing arm 3 to take out a desired one of discs held in the stocker 4, the movable stockers constituting the stocker 4 can be divided Into up and down positions at a desired position by a stocker dividing mechanism 6.

A disc pushing mechanism 20 that pushes one disc accommodated in the stocker 4 is provided within the casing of the disc changer at a rear surface side of the stocker 4 having the plural movable stockers. The height of the disc pushing mechanism 20 from the bottom surface of the disc changer 1 is fixed. The disc pushing mechanism 20 pushes a disc within a movable stocker 4 at a predetermined position, to a disc discharge position, based on the move of the stocker 4 in the up and down directions. The disc discharge mechanism discharges the disc pushed to the disc discharge position, to the outside of a disc insertion/discharge opening 21 of the disc changer 1. The disc guiding device according to the present invention securely guides a disc to the disc discharge mechanism when the disc is pushed to the disc discharge position by the pushing mechanism. The disc guiding mechanism is provided at a position adjacent to the disc insertion/discharge opening 21 within the disc changer 1.

Figure 2A:
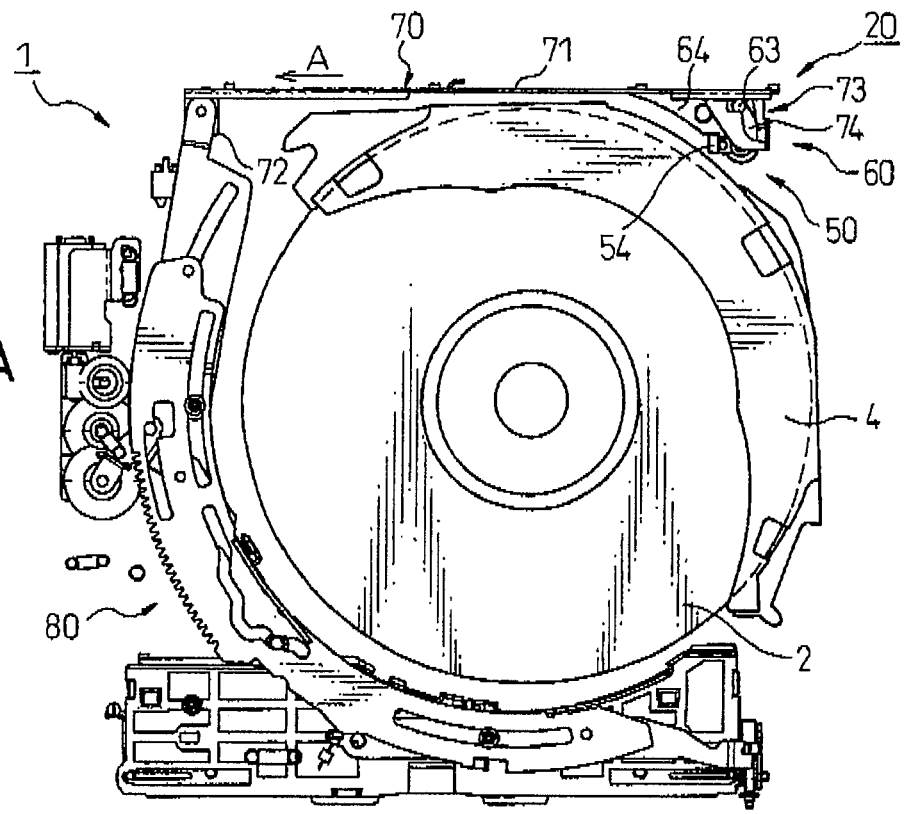
FIG. 2A is a top plan view of a relevant part of the disc exchanger showing a state before the disc changer starts a disc push operation in a disc discharge operation carried out by the disc exchanger according to the present invention.

The operation of the disc changer 1 according to the present invention which discharges a disc 2 to the outside is explained below, together with the operation of the stocker 4 that accommodates the disc 2, and a drive mechanism 80 of an operation lever 70, with reference to FIG. 2A to FIG. 4. FIG. 2A shows a state before the disc changer 1 starts a disc push operation. The disc pushing mechanism 20 is not operating in this state. In the present embodiment, the disc pushing mechanism 20 includes a first lever 50, and a second lever 60. The first lever 50 is positioned near the rotation axis of the second lever 60, and starts turning earlier than the second lever 60, based on the operation of the operation lever 70. The first lever 50 has a wedged lever 54 having a tapered edge. The disc pushing mechanism 20 does not need to have both the first and the second levers 50 and 60, and can have only the second lever 60.

The operation lever 70 that operates the disc pushing mechanism 20 includes a main body 71, an operation input unit 72, a through-hole 73, a guide groove 74, a cylindrical operation projection 63 and an operation output unit 75. The operation input unit 72 of the operation lever 70 is connected to the drive mechanism 80. Based on the operation of the drive mechanism 80, the operation lever 70 is pulled to a direction of an arrowhead A in the drawings, and is returned to a direction opposite to the direction of the arrowhead A. In this state, the wedge lever 54 of the first lever 50 and a pushing lever 64 of the second lever 60 are positioned at the outside of the stocker 4 that accommodates the disc 2. Therefore, in this state, the wedge lever 54 and the pushing lever 64 do not interrupt the lifting up and moving down of the stocker 4.

Figure 2B:
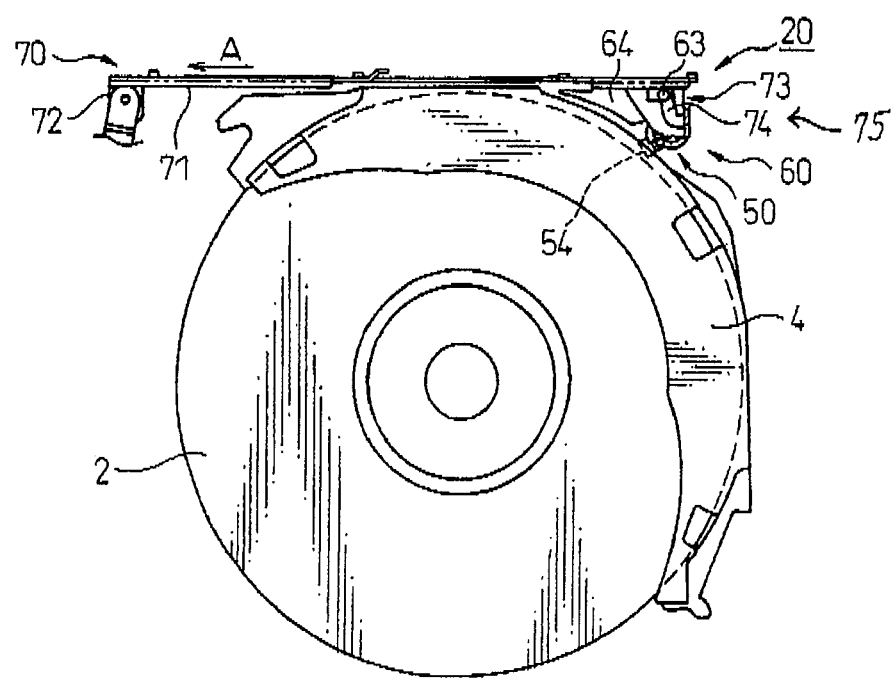
FIG. 2B is a top plan view of a relevant part of the disc exchanger showing a push lever operation in the disc discharge operation carried out by the disc exchanger according to the present invention.

FIG. 2B shows a state that the operation lever 70 has slightly moved to the direction of the arrowhead A from the position shown in FIG. 2A. In this state of the disc pushing mechanism 20, only the wedge lever 54 of the first lever 50 is turned, and the wedge lever 54 is inserted into a space between a movable stocker that holds the disc 2 to be discharged and a movable stocker below the movable stocker holding the disc 2, thereby securing the space between the two movable stockers. Because the wedge lever 54 has a tapered wedge shape, the wedge lever 54 is securely inserted into between the two movable stockers, thereby securing the space between the movable stocker holding the disc to be discharged and the movable stocker below this movable stocker. In this state, the pushing lever 64 of the second lever 60 is positioned at the outside of the stocker 4 that accommodates the disc 2.

Figure 3A:
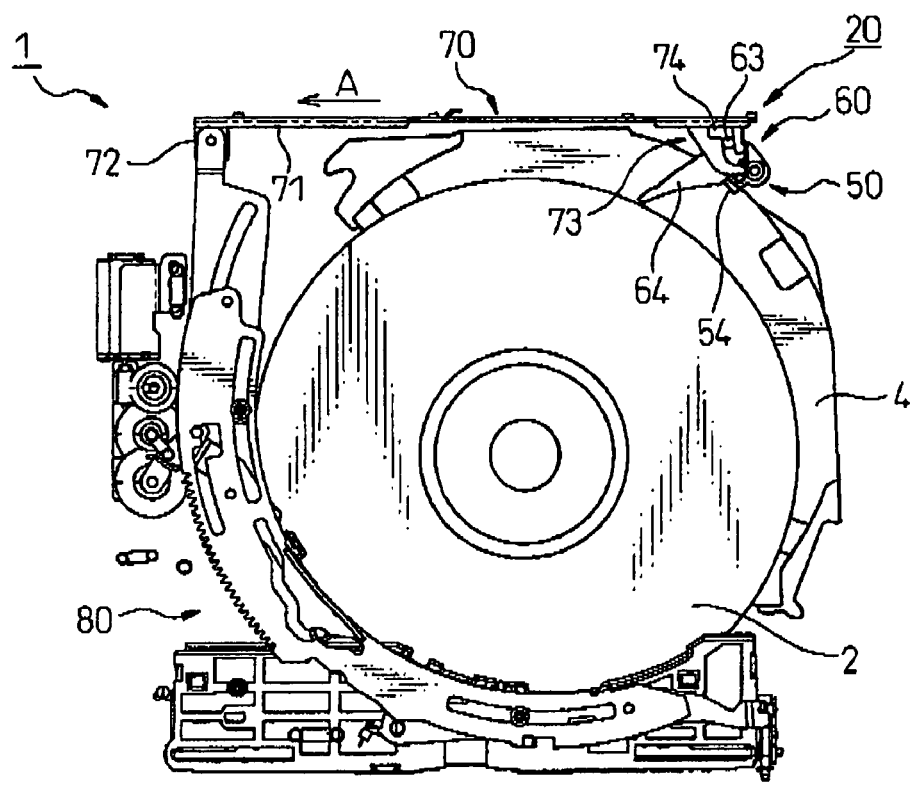
FIG. 3A is a top plan view of a relevant part of the disc exchanger showing a disc push operation of the push lever in the disc discharge operation carried out by the disc exchanger according to the present invention.

FIG. 3A shows a state that the operation lever 70 has further moved to the direction of the arrowhead A from the position shown in FIG. 2B. In FIG. 3A, parts positioned above the pushing lever 64 of the stocker 4 shown in FIG. 2B are omitted. In this state, the pushing lever 64 of the second lever 60 is turned, following the wedge lever 54 of the first lever 50, and is inserted into the space between the movable stocker secured by the wedge lever 54 and the movable stocker below this movable stocker, thereby pushing out the disc 2 held by the upper movable stocker. The pushing lever 64 of the second lever 60 is turned together with the wedge lever 54 of the first lever 50, when the pushing lever 64 reaches the wedge lever 54.

Figure 3B:
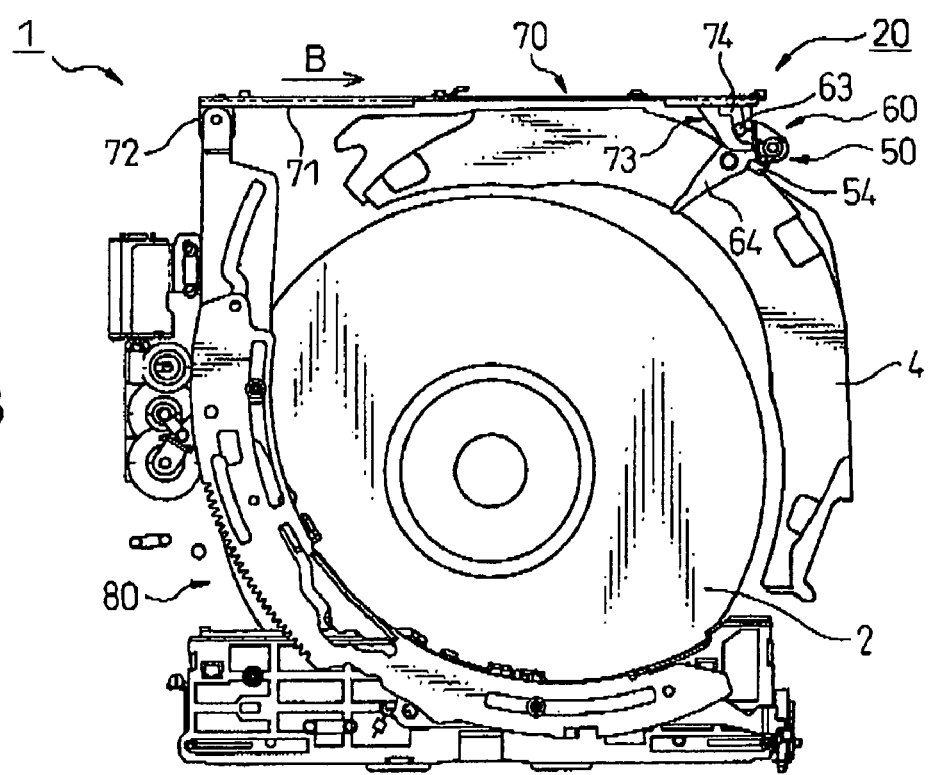
FIG. 3B is a top plan view of a relevant part of the disc exchanger showing a state that a disc reaches a discharge position by the disc push operation of the push lever in the disc discharge operation carried out by the disc exchanger according to the present invention.

FIG. 3B shows a state that the operation lever 70 has further moved to the direction of the arrowhead A from the position shown in FIG. 3A. FIG. 3B shows a state that the pushing lever 64 is completely turned. In this state, the disc 2 held by the movable stocker is completely pushed out from the stocker 4, and reaches the disc discharge position. Thereafter, the operation lever 70 is moved to a direction indicated by an arrowhead B, and returns to the position shown in FIG. 2A.

Figure 4:
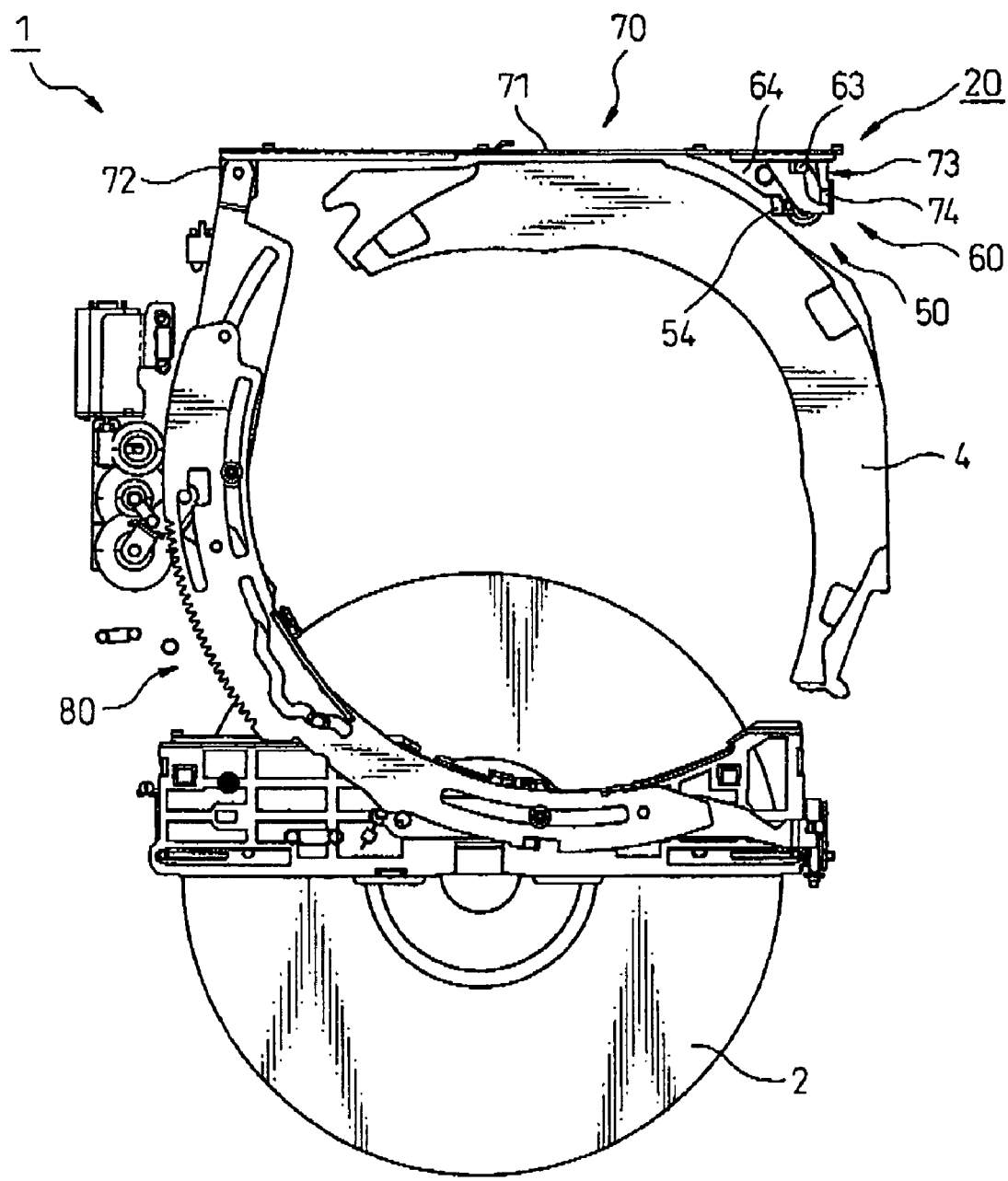
FIG. 4 is a top plan view of a relevant part of the disc exchanger showing a state that a disc discharge mechanism has discharged a disc after the disc reaches the discharge position by the disc push operation of the push lever in the disc discharge operation carried out by the disc exchanger according to the present invention.

FIG. 4 shows a state that the disc discharge mechanism has completely discharged the disc 2, that is inserted in the space between the two movable stockers, from the stocker 4, and the disc 2 has reached the discharge position of the disc 2. When the disc 2 reaches the discharge position, the discharge mechanism (i.e., a discharger roller) not shown discharges the disc 2 to a position exposed to the outside of the disc changer 1, via the disc insertion/discharge opening 21 shown in FIG. 1. In this state, the disc 2 can be easily taken out from the outside of the disc changer 1.

As is clear from the operation explained in the above embodiment, the disc pushing mechanism 20 pushes the disc 2 held in the stocker 4 to the discharge position, based on the operation of the second lever 60 having a large turning radius. At this discharge position, a part of the disc 2 is latched by the disc discharge mechanism. Thereafter, the disc 2 is smoothly discharged to the outside of the disc drive unit by the roller held in the disc discharge mechanism (83 in FIGS. 5A to 6B).

In the disc discharge operation, when the disc is discharged from the stocker and is pushed to the discharge position, there is a possibility that the front end of the disc is fluctuated. When the front end of the disc is fluctuated, the disc is collided against a part of the disc insertion/discharge opening of the disc drive unit. To overcome this difficulty, according to the present invention, a disc guiding device 10 capable of smoothly guiding the disc, discharged from the stocker, to the insertion/discharge opening is provided at a pre-stage of the disc discharge mechanism of the disc drive unit. A configuration and operation of the disc guiding device according to the present invention are explained below with reference to FIG. 5A to FIG. 7C. FIG. 5A to FIG. 7C show only the pushing lever 64 of the second lever 60 of the disc pushing mechanism 20 having a direct relationship with the pushing of the disc 2.

Figure 5A:
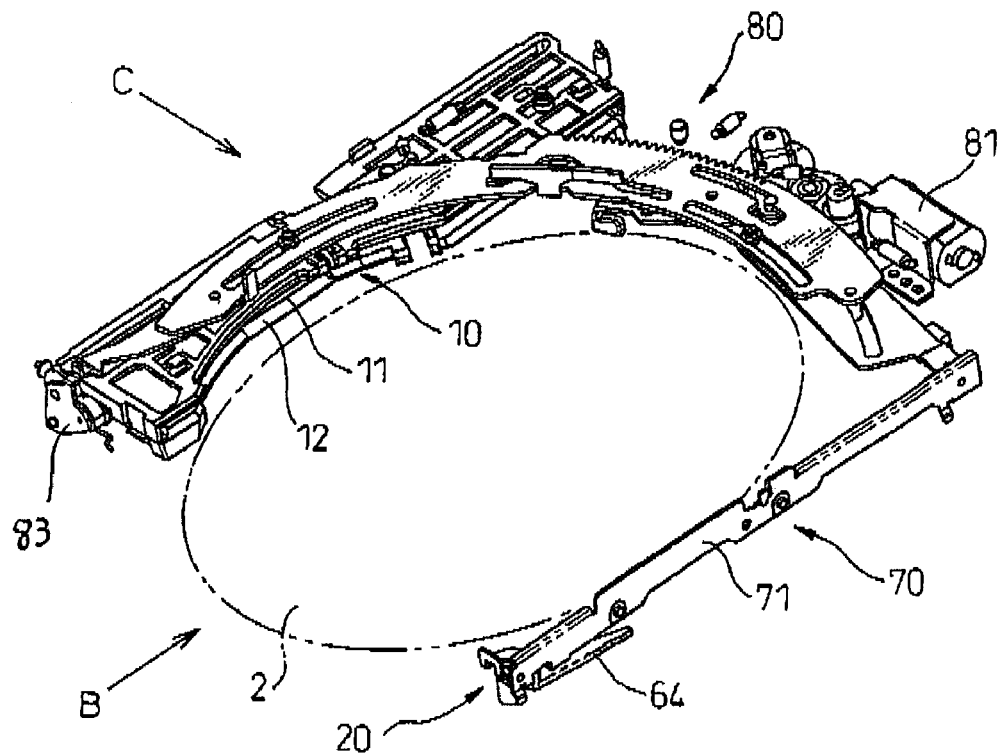
FIG. 5A is a perspective view of a disc guiding device showing a state before a pushing lever pushes a disc.
Figure 5B:
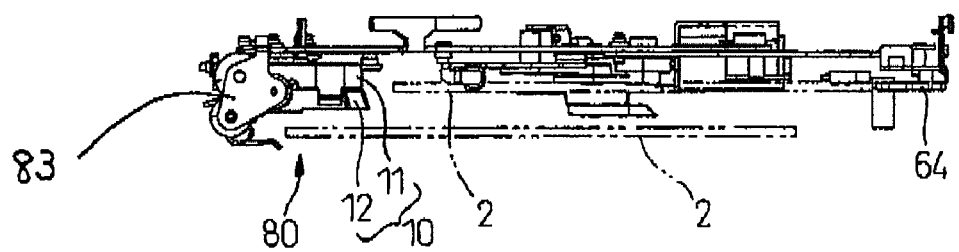
FIG. 5B is a side view of the disc guiding device observed from a direction of an arrowhead B in FIG. 5A.
Figure 5C:
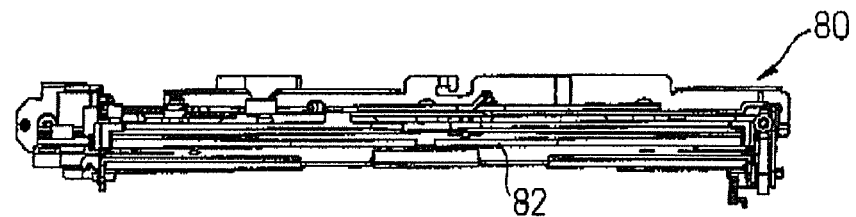
FIG. 5C is a side view of the disc guiding device observed from a direction of an arrowhead C in FIG. 5A.

FIG. 5A shows a state of the disc guiding device 10, the disc pushing mechanism 20, the operation lever 70, and the drive mechanism 80, before the pushing lever 64 of the disc pushing mechanism 20 pushes out the disc 2. FIG. 5B is a side view of the disc guiding device observed from a direction of an arrowhead B in FIG. 5A. FIG. 5C is a side view of the disc guiding device observed from a direction of an arrowhead C in FIG. 5A. The disc guiding device 10 includes an upper guiding member 11 and a lower guiding member 12. The disc guiding device 10 is driven by a motor 81 provided in the drive mechanism 80 in the extension of a disc discharge path. The upper guiding member 11 and the lower guiding member 12 of the disc guiding device 10 have a tapered surface, respectively. The motor 81 of the drive mechanism 80 also drives the pushing lever 64 of the pushing mechanism 20 via the operation lever 70.

In the state before the disc 2 is pushed out, the lower guiding member 12 of the disc guiding device 10 is closed, and a disc discharge opening 82 is also closed as shown in FIG. 5C. As explained above, the lower guiding member 12 is usually closed. This is because a position indicated by a chain double-dashed line below the lower guiding member 12 is a position of reproducing the content of the disc 2, as shown in FIG. 5B, and because when the lower guiding member 12 is usually opened, the lower guiding member 12 is brought into contact with the disc 2 of which content is being reproduced. In this closed state, a gap of one disc is formed between the upper guiding member 11 and the lower guiding member 12 of the disc guiding device 10. The pushing lever 64 of the disc pushing mechanism 20 is positioned with a distance from the external periphery of the disc 2.

Figure 6A:
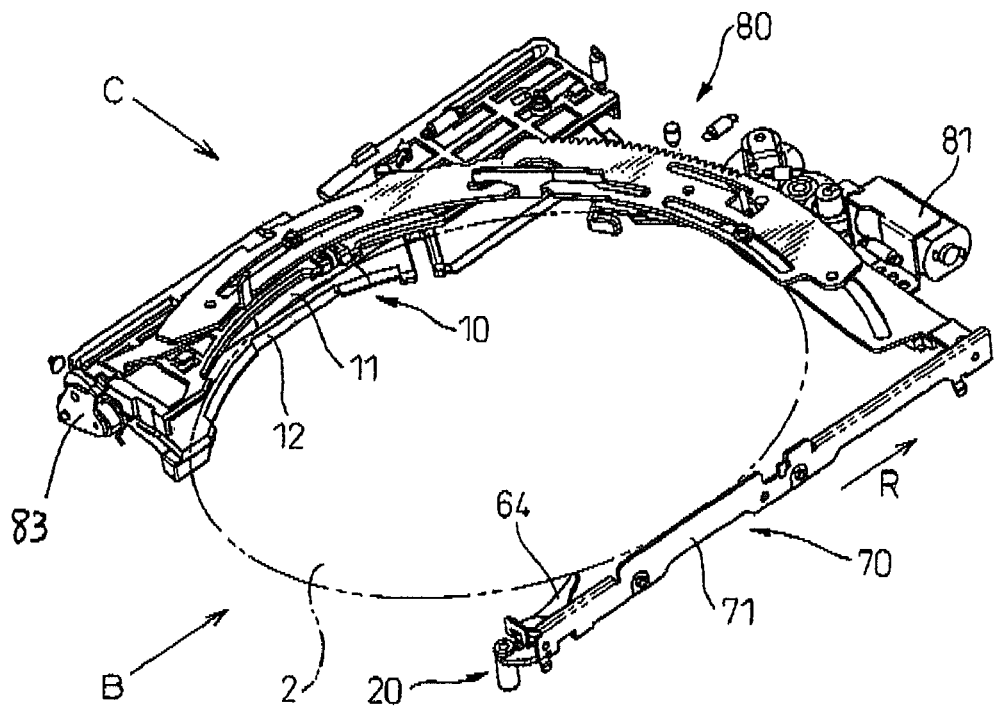
FIG. 6A is a perspective view of the disc guiding device showing a state that the pushing lever pushes the disc.
Figure 6B:
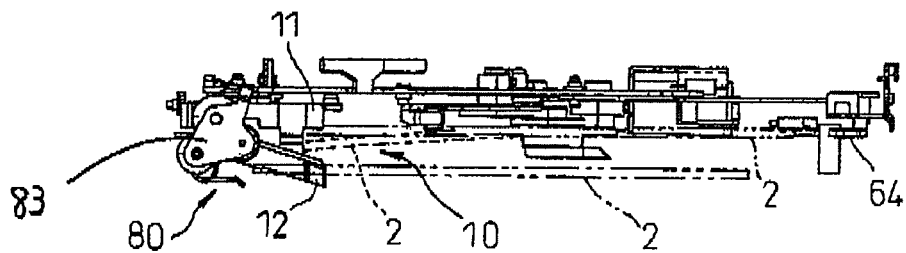
FIG. 6B is a side view of the disc guiding device observed from a direction of an arrowhead B in FIG. 6A.
Figure 6C:
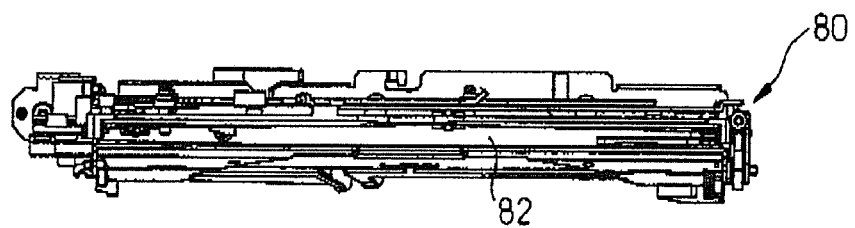
FIG. 6C is a side view of the disc guiding device observed from a direction of an arrowhead C in FIG. 6A.

FIG. 6A shows a state of the disc guiding device 10, the disc pushing mechanism 20, the operation lever 70, and the drive mechanism 80, when the pushing lever 64 of the disc pushing mechanism 20 pushes out the disc 2. FIG. 6B is a side view of the disc guiding device observed from a direction of an arrowhead B in FIG. 6A. FIG. 6C is a side view of the disc guiding device observed from a direction of an arrowhead C in FIG. 6A. When the disc 2 is pushed out, the motor 81 of the drive mechanism 80 rotates. As a result, a link mechanism not shown operates to open the lower guiding member 12 of the disc guiding device 10 relative to the upper guiding member 11. The operation lever 70 moves to a direction of an arrowhead R, and the pushing lever 64 of the pushing mechanism 20 pushes the disc 2 out. The lower guiding member 12 is opened to a side lower than the reproduction position of the disc 2 indicated by the chain double-dashed line shown in FIG. 5B.

The motor 81 provided in the drive mechanism 80 is simultaneously operated for the disc guiding device 10 to move the lower guiding member 12 and for the disc pushing member 20 to move the pushing lever 64. In other words, linked to the move of the pushing lever 64, the height of the opening between the upper guiding member 11 and the lower guiding member 12 is increased. With this arrangement, even when the front end of the disc 2 is fluctuated at the time of moving the disc 2 as indicated by the dashed line, the disc 2 is guided by the lower guiding member 11 that is opened to a lower side, and is correctly guided to the opening 82 for discharging the disc as shown in FIG. 6C. The upper guiding member 11 and the lower guiding member 12 guide the disc 2 to the roller provided in the disc insertion/discharge mechanism 83.

Figure 7A:
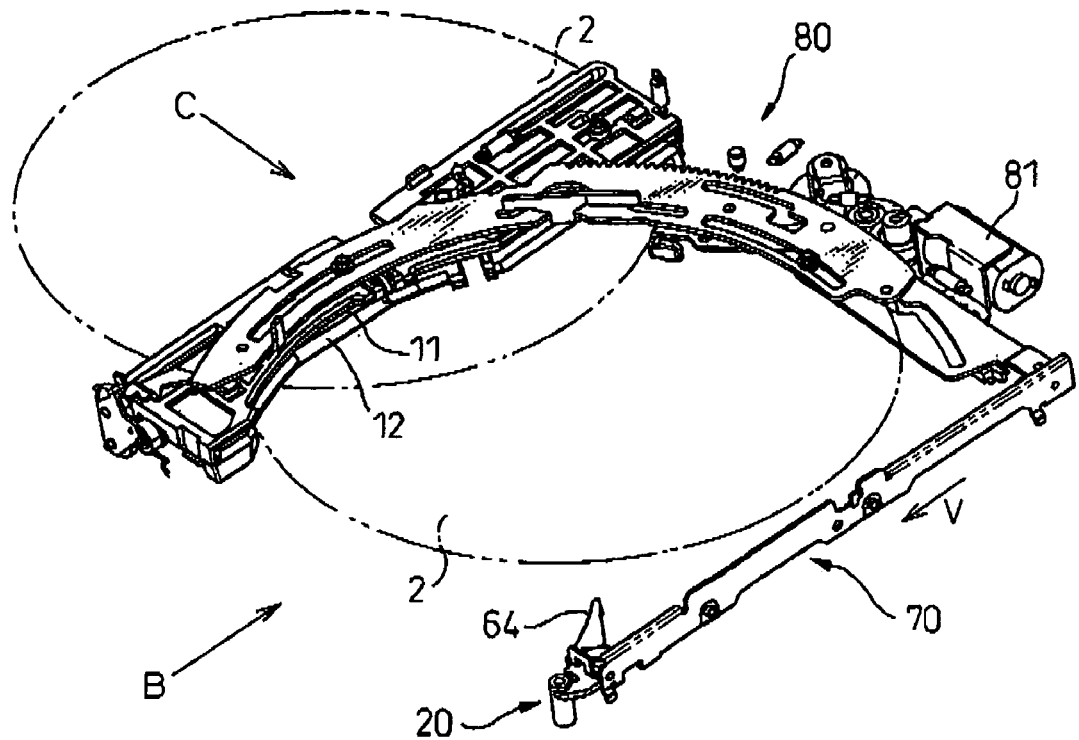
FIG. 7A is a perspective view of the disc guiding device showing a state after the pushing lever pushes the disc.
Figure 7B:
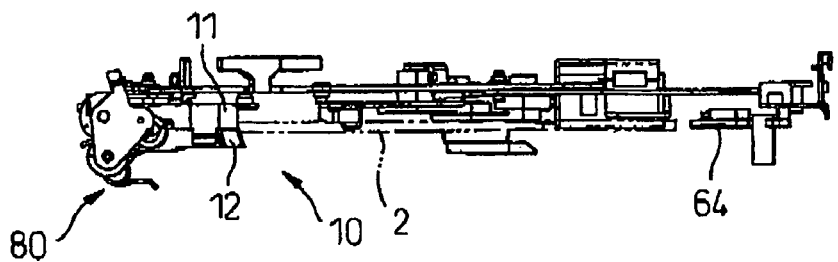
FIG. 7B is a side view of the disc guiding device observed from a direction of an arrowhead B in FIG. 7A.
Figure 7C:
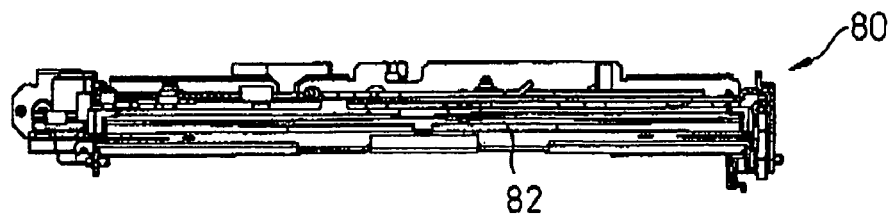
FIG. 7C is a side view of the disc guiding device observed from a direction of an arrowhead C in FIG. 7A.

FIG. 7A shows a state of the disc guiding device 10, the disc pushing mechanism 20, the operation lever 70, and the drive mechanism 80, when the pushing lever 64 of the disc pushing mechanism 20 has pushed the disc 2 to the disc discharge position. FIG. 7B is a side view of the disc guiding device observed from a direction of an arrowhead B in FIG. 7A. FIG. 7C is a side view of the disc guiding device observed from a direction of an arrowhead C in FIG. 7A. When the disc 2 is pushed out and reaches the discharge position, the motor 81 of the drive mechanism 80 rotates. As a result, the link mechanism not shown operates to close the lower guiding member 12 of the disc guiding device 10 relative to the upper guiding member 11.

As a result, when the disc 2 is at the reproduction position, the disc 2 is not brought into contact with the lower guiding member 12. Thereafter, the operation lever 70 moves to a direction of an arrowhead V, and the pushing lever 64 of the pushing mechanism 20 is returned to the position shown in FIG. 5B.

After the pushing lever 64 of the disc pushing mechanism 20 pushes out the disc 2, when the disc guiding device 10 pushes out the disc 2 to the disc discharge position, the front end of the disc 2 reaches the position of the roller provided in the disc insertion/discharge mechanism inside the disc drive mechanism 80. Thereafter, the disc 2 is conveyed by the roller, and is discharged to the outside of the disc drive unit.

As explained above, according to the present invention, the disc guiding device of the disc exchanger securely sends a disc to the roller of the disc insertion/discharge mechanism, at the time of discharging the disc.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:
1. A disc changer for a disc drive unit comprising:
a disc accommodation section capable of accommodating a plurality of discs;
a disc reproducing section configured to reproduce a content of a disc;
a disc discharge mechanism configured to discharge a disc pushed by a disc pushing mechanism toward a discharge direction, from a disc discharge opening of the disc drive unit, wherein the disc discharge mechanism is positioned at an opposite side of the disc discharge opening;
a disc guiding device including an upper guiding member and a lower guiding member and provided near the disc discharge opening, and configured to guide the disc carried by the disc pushing mechanism to the disc discharge mechanism, wherein the upper guiding member being fixed to the disc drive unit, wherein the lower guiding member has a tapered surface, and wherein only the lower guiding member is moved; and
a disc guiding device drive mechanism configured to position the lower guiding member to a position where the lower guiding member closes the disc discharge opening and is not brought into contact with the disc when the content of the disc is being reproduced, and when the disc is being discharged, the disc guiding device drive mechanism is configured to move the disc pushed by the disc pushing mechanism to a guided position by vertically moving the lower guiding member to a position where the lower guiding member opens the discharge opening and is lower than a position of the disc, wherein the discharge opening is formed by an inclined spacing between the upper and lower guiding members, the inclined spacing being larger on the disc discharge mechanism side than on the disc discharge opening side.

2. The disc changer for a disc drive unit according to claim 1, wherein
a drive source of the disc pushing mechanism and a drive source of the drive mechanism of the lower guiding member are the same.

3. The disc changer for a disc drive unit according to claim 1, wherein
the drive mechanism is configured to drive the lower guiding member at the disc discharge time to form a tapered surface from a side of the carrying mechanism toward the disc discharge opening.

4. The disc changer for a disc drive unit according to claim 3, wherein
the disc guiding device drive mechanism is configured to drive the lower guiding member in accordance to a movement of a disc pushing lever of the disc pushing mechanism.

5. The disc changer for a disc drive unit according to claim 4, wherein the lower guiding member has a tapered surface, and wherein
the disc guiding device drive mechanism is configured to increase a slope angle of the tapered surface of the lower guiding member when a rotation angle of the pushing lever increases in accordance to the movement of the disc pushing lever of the disc pushing mechanism.

6. The disc changer for a disc drive unit according to claim 3, wherein
a drive source of the disc pushing mechanism and a drive source of the drive mechanism of the lower guiding member are the same.

7. The disc changer for a disc drive unit according to claim 6, wherein
the disc guiding device drive mechanism is configured to drive the lower guiding member in accordance to a movement of a disc pushing lever of the disc pushing mechanism.

8. The disc changer for a disc drive unit according to claim 7, wherein the lower guiding member has a tapered surface, and wherein
the disc guiding device drive mechanism is configured to increase a slope angle of the tapered surface of the lower guiding member when a rotation angle of the pushing lever increases in accordance to the movement of the disc pushing lever of the disc pushing mechanism.

9. The disc changer for a disc drive unit according to claim 8, wherein a height of an opening of the lower guiding member is approximately equal to the height of the disc.

10. The disc changer for a disc drive unit according to claim 1, wherein a height of an opening of the lower guiding member is approximately equal to the height of the disc.

11. A disc changer for a disc drive unit comprising:
a disc accommodation section capable of accommodating a plurality of discs;
a disc reproducing section configured to reproduce a content of a disc;
a disc pushing mechanism having a disc pushing lever for pushing the disc;
a disc discharge mechanism configured to discharge a disc carried by the disc pushing mechanism toward a discharge direction, from a discharge opening of the disc drive unit, wherein the disc discharge mechanism is positioned at an opposite side of the disc discharge opening;
a disc guiding device provided near the disc discharge opening, and configured to guide the disc carried by the pushing mechanism to the disc discharge mechanism, wherein the disc guiding device includes an upper guiding member and a lower guiding member, the upper guiding member being fixed to the disc drive unit, wherein the upper guiding member and the lower guiding member are configured to form an opening therebetween, the opening having a height, and wherein the height of the opening between the upper guiding member and the lower guiding member increases in accordance to a movement of the disc pushing lever, and wherein the lower guiding member has a tapered surface; and
a disc guiding device drive mechanism for driving the lower guiding member in a vertical direction relative to the upper guiding member.

12. The disc changer for a disc drive unit according to claim 11, wherein a drive source of the disc pushing mechanism and a drive source of the guiding device drive mechanism are the same.

* * * * *